United States Patent Office 3,516,992
Patented June 23, 1970

3,516,992
3-(2-AMINO-5-HALO-, 5-ALKYL- AND -5-ALKOXY-BENZOYL) BENZENE SULFONAMIDES
Stanley C. Bell, Narberth, Pa., assignor to American Home Products Corporation, New York, N.Y., a corporation of Delaware
No Drawing. Filed Jan. 18, 1967, Ser. No. 609,999
Int. Cl. C07c *143/78;* A61k *27/00*
U.S. Cl. 260—239.7                   5 Claims

ABSTRACT OF THE DISCLOSURE

3 - (2 - amino - 5-halo-, 5-alkyl- and 5-alkoxybenzoyl) benzenesulfonamides (I) are obtained by treating 2-amino-5-halo-, 5-alkyl- or 5-alkoxybenzophenones with chlorosulfonic acid, then with ammonia. Compounds I and monoacylamino derivatives thereof have depressant, antiamebic and antiviral properties.

---

This invention relates to benzoyl benzenesulfonamides and derivatives thereof. More particularly, it relates to 3-(2-amino-5-halo- or alkyl- or alkoxybenzoyl)benzenesulfonamides which may additionally be substituted with halogen, alkyl, alkoxy or amino, substituted amino and heteroamino groups and monoacyl derivatives thereof. The compounds of this invention possess central nervous system depressant, antiamebic and antiviral activity.

The compounds contemplated by this invention are those of Formula I:

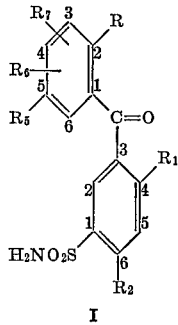

I wherein R is amino or monoacylamino;
$R_1$ and $R_2$ are hydrogen, halogen, alkyl, alkoxy or

$R_3$ and $R_4$ are hydrogen, lower alkyl or

—$CH_2CH_2OCH_2CH_2$— and
$R_5$, $R_6$ and $R_7$ are halogen, alkyl, or alkoxy, said monoacylamino group containing from 1 to 6 carbon atoms and being unsubstituted or substituted with from 1 to 2 chlorine atoms and said alkyl and alkoxy groups containing from 1 to 6 carbon atoms.

Special mention is made of particularly important embodiments of this invention: These are 3-(2-amino-5-chlorobenzoyl)-4-chlorobenzenesulfonamide, a compound of Formula I wherein $R_1$ is chloro and R is amino; 3-(2-amino-5-chlorobenzoyl)- benzenesulfonamide, a compound of Formula I wherein $R_1$ is hydrogen and R is amino; 3-[2-mono(dichloroacetyl) amino-5-chlorobenzoyl] benzenesulfonamide, a compound of Formula I wherein $R_1$ is hydrogen and R is mono-(dichloroacetyl) amino; 3 - [2-mono(dichloroacetyl)amino - 5-chlorobenzoyl] - 4 - chlorobenzenesulfonamide, a compound of Formula I wherein $R_1$ is chloro and R is mono-(dichloroacetyl)amino; 3 - [2-mono(3-chloropropropionyl)amino-5 - chlorobenzoyl]benzenesulfonamide, a compound of Formula I wherein $R_1$ is hydrogen and R is mono(3-chloropropionyl)amino; 3-(2-formylamino-5-chlorobenzoyl) benzenesulfonamide, a compound of Formula I wherein $R_1$ is hydrogen and R is monoformylamino and 3-(2-amino-5 - chlorobenzoyl) - 4 - morpholinobenzenesulfonamide, a compound of Formula I wherein $R_1$ is morpholino and R is amino. These compounds are especially useful as antiamebic, depressant and antiviral agents.

When used herein and in the appended claims, the term "monoacylamino" contemplates a group derived from a saturated organic acid containing from 1 to 6 carbon atoms and containing only carbon, hydrogen and oxygen or carbon, hydrogen, oxygen and chlorine. The acyl group can be unsubstituted or can be substituted with from 1 to 2 chlorine atoms. Illustrative of the monoacylamino groups contemplated, therefore, are formylamino, acetylamino, chloroacetylamino, dichloroacetylamino, 3 - chloropropionylamino, 2,2 - dichloropropionylamino, 2,3-dichloropropionylamino, butyroylamino, valeroylamino, hexanoylamino, and the like. The terms "alkyl" and "alkoxy" include straight and branched chain hydrocarbon residues and oxo derivatives thereof of up to about 6 carbon atoms and illustrative of which are methyl, ethyl, i-propyl, n-butyl, t-butyl, n-pentyl, 3-methylpentyl, n-hexyl, methoxy, ethoxy, i-propoxy, n-butoxy, t-butoxy, n-pentoxy, 3-methylpentoxy, n-hexyloxy and the like. The term "halogen" includes fluorine, chlorine, bromine and iodine.

The new compounds of this invention can be obtained by the following synthetic pathways, or obvious chemical equivalents thereof:

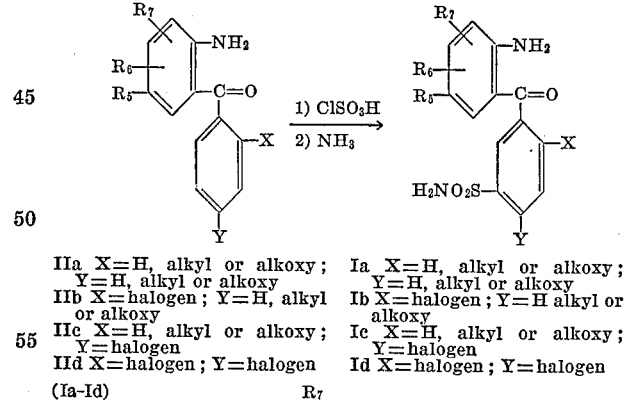

IIa X=H, alkyl or alkoxy; Y=H, alkyl or alkoxy
IIb X=halogen; Y=H, alkyl or alkoxy
IIc X=H, alkyl or alkoxy; Y=halogen
IId X=halogen; Y=halogen Ia X=H, alkyl or alkoxy; Y=H, alkyl or alkoxy
Ib X=halogen; Y=H alkyl or alkoxy
Ic X=H, alkyl or alkoxy; Y=halogen
Id X=halogen; Y=halogen (Ia-Id)

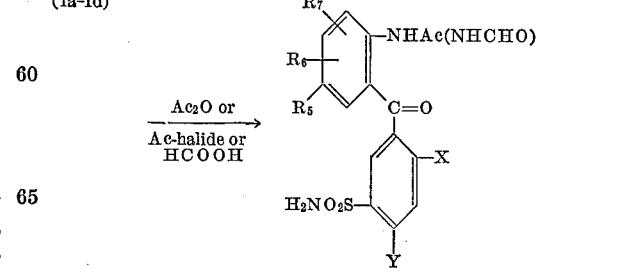

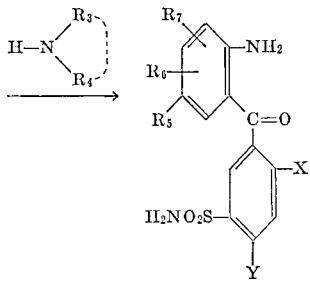
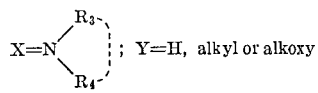
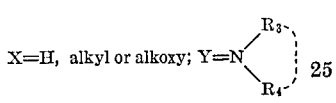
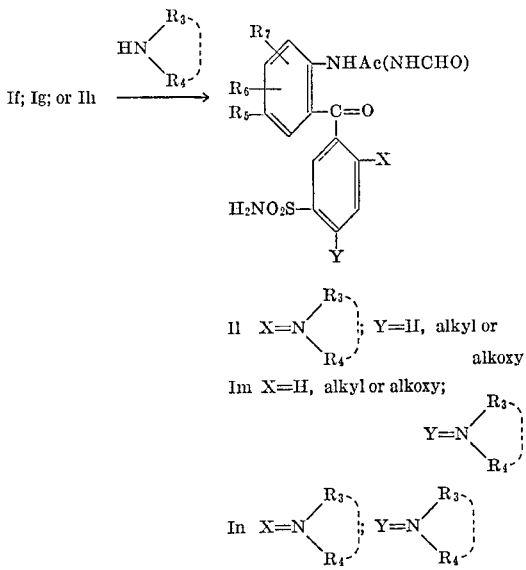

The aminobenzoylbenzenesulfonamides (I$a$–I$d$) are obtained by treating a 2-amino-5-halo-; 5-alkyl- or 5-alkoxy benzophenone (II$a$–II$d$) with at least an equimolar amount, and preferably an excess, of chlorosulfonic acid until substitution on the non-amino-substituted aromatic ring by a sulfonyl chloride group is substantially complete; then converting the sulfonyl chloride group to a sulfonamido group with ammonia. Formation of the sulfonyl chlorides takes place easily if the mixture of the benzophenone (II$a$–II$d$) and chlorosulfonic acid is heated at about 100° C. for about 1 hour; they are recovered by adding the mixture to ice, then filtering off the solid product. The sulfonamido compound is obtained by adding the sulfonyl chloride to concentrated aqueous ammonia solution, preferably in the presence of a water miscible alcohol, such as ethanol, and heating the mixture on a steam bath for at least about an hour; the products (I$a$–I$d$) are recovered, after cooling the reaction mixture, by filtration, and can be purified by recrystallization, if desired, from acetonitrile or 1,2-dichloroethane, and the like.

The mono-acylated benzenesulfonamides (I$e$–I$h$) are prepared by treating an appropriate amino compound (I$a$–I$d$) with an acyl halide, an acid anhydride or, in the case of the formyl derivative, with formic acid. It is convenient, when using the acyl halide, to suspend the reaction mixture in a chlorinated hydrocarbon solvent, such as chloroform, and to reflux the mixture for about one hour. On the other hand, when using formic acid to introduce a formyl group, an excess of 98–100% formic acid is used as a diluent and the mixture is refluxed for about 3 hours. The acylamino compounds other than formylamino, are recovered by cooling the reaction mixture and filtering off the precipitated products. The formylamino compounds are recovered by evaporating off the diluent in a vacuum and triturating the residue with 1,2-dichloroethane. Compounds of Formulae (I$e$–I$h$) are purified by recrystallization from a solvent, such as ethanol.

The amino, monoalkylamino, dialkylamino and morpholino-substituted benzenesulfonamides (I$i$–I$n$) can be obtained by treating the appropriate halo benzenesulfonamide of Formulae (I$b$–I$d$ and I$f$–I$h$) with an amine of the formula

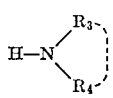

wherein $R_3$ and $R_4$ are as defined above. The introduction of an amino group requires, therefore, treatment of a halo-substituted compound with ammonia, which is preferably carried out in a solution of ammonia in a solvent, such as ethanol and, because of the volatility of ammonia, in a vessel adequate to withstand moderate pressure. Monoalkylamino and dialkylamino substituents are introduced by reacting the said halo compounds with the monoalkylamine or dialkylamine, using a pressure vessel if the amine is appreciably volatile at the reaction temperatures. The morpholino-substituted benzenesulfonamides can be obtained by treating the chlorobenzenesulfonamide with morpholine. It is convenient to use an excess of the morpholine as a diluent and to carry out the reaction at reflux temperatures for about 18 hours. If the reactions are carried out in a solvent, the products are recovered by evaporating off the volatile reactants and solvent and recrystallizing the residue from mixtures of alcohol and water.

The compounds of Formula I possess valuable pharmaceutical properties. In particular these new compounds possess central nervous system activity and are useful as central nervous system depressants, especially as antinauseants, sedatives, tranquilizers and anticonvulsants. In addition, they are useful as antiamebics and as antiviral agents.

When used for the purposes illustrated above, it may be desirable according to conventional pharmaceutical practice to combine the specific compound selected into compositions suitable for enteral or parenteral administration by formulation with a pharmaceutically acceptable organic or inorganic carrier. The composition may be prepared in solid form, such as tablets or in liquid form such as a solution, suspension or emulsion. Suitable liquid carriers include water, gelatin, lactose, starch, talc, vegetable oils, alcohols, polyalcohols, gums, syrups, and the like. The pharmaceutical composition in addition to the active principle and the carrier may include auxiliary materials such as coloring, stabilizing, wetting or emulsifying agents. It is, of course, to be understood that the carrier as well as any other materials present with the active principle be inert with respect thereto.

The dosage of the present therapeutic agents will vary with the form of administration and the particular compound selected. Furthermore, the dosage will vary with the particular subject being treated. Generally treatment is initiated with small dosages, substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally (which is not the preferred route for antiamebic and antiviral agents). In general, the compounds of this invention are most desirably administered at a concentration level that will generally afford effective results without causing any harmful or deleterious side effects and preferably at a level that is in the range of from about 40 mg. to about 3000 mg. per day for the adult human, although, as mentioned, variations will occur. However, a dosage level that is in the range of from about 150 mg. to about 2000 mg. per day is most desirably employed to achieve effective results.

Of course, as will be obvious to those skilled in the art, compounds of Formula I wherein R is monoacylamino can be alternatively named as anilide derivatives of the respective carboxylic acid residue. Thus 3-[2-mono (dichloroacetyl)amino - 5-chlorobenzoyl] benzenesulfonamide can be designated 2,2,4'-trichloro-2'-(m-sulfamoylbenzoyl)acetanilide; 3-[2-mono(dichloroacetyl]amino-5-chlorobenzoyl]-4-chlorobenzenesulfonamide can be designated 2,2,4' - trichloro-2'-(2-chloro-5-sulfamoylbenzoyl) acetanilide; 3-(2-formylamino-5-chlorobenzoyl) benzenesulfonamide can be designated 4'-chloro-2'-(m-sulfamoylbenzoyl) formanilide, and so forth.

The following examples are illustrative of products which are part of the instant invention. They are not to be construed to limit the claims in any manner whatsoever.

EXAMPLE 1

3-(2-amino-5-chlorobenzoyl)-4-chlorobenzenesulfonamide

To 180 ml. of chlorosulfonic acid is added, with stirring and cooling, 92.0 g. of 2-amino-2',5-dichlorobenzophenone. The reaction mixture is heated on a steam bath for one hour, cooled, decomposed on ice, and the resulting yellow solid is filtered. The solid sulfonyl chloride is added to a solution of 350 ml. of ethanol and 250 ml. of conc. ammonium hydroxide and heated on a steam bath for 1.5 hours. The reaction mixture is cooled and the precipitated product collected and washed with an alcohol-water mixture. There is obtained 58 g., M.P., 213–215° C. A sample recrystallized from acetonitrile melts at 216–8° C.

EXAMPLE 2

3-(2-amino-5-chlorobenzoyl)benzenesulfonamide

The procedure of Example 1 is repeated substituting 80 g. of 2-amino-5-chlorobenzophenone for the di-chlorobenzophenone. There is obtained 40 g. of product which, after recrystallization from 1,2-dichloroethane, melts at 156–157° C.

EXAMPLE 3

3-[2-mono(dichloroacetyl)amino-5-chlorobenzoyl] benzenesulfonamide

A mixture of 25 g. of 3-(2-amino-5-chlorobenzoyl) benzenesulfonamide, 300 ml. of chloroform and 15 g. of dichloroacetyl chloride is refluxed for 1 hour. The reaction mixture is cooled, filtered and the product is recrystallized from ethanol.

There is obtained 31 g., M.P., 185–186° C. as the ethanol solvate.

EXAMPLE 4

3-[2-mono(dichloroacetyl)amino-5-chlorobenzoyl]-4-chlorobenzenesulfonamide

The procedure of Example 3 is repeated substituting an equimolar amount of 3 - (2 - amino - 5 - chlorobenzoyl)-4-chlorobenzenesulfonamide and the product, M.P., 192–193° C. is obtained.

EXAMPLE 5

3-[2-mono(3-chloropropionyl)amino-5-chlorobenzoyl]benzenesulfonamide

The procedure of Example 3 is repeated substituting equivalent amounts of 3-chloropropionyl chloride and 3-(2 - amino - 5-chlorobenzoyl)benzenesulfonamide and the product, M.P. 163–165° C. is obtained.

EXAMPLE 6

3-(2-formylamino-5-chlorobenzoyl) benzenesulfonamide

A mixture of 3.5 g. of 3-(2-amino-5-chlorobenzoyl) benzenesulfonamide and 30 ml. of 98–100% formic acid is refluxed for 3 hours. The solvent is removed in a vacuum, 1,2-dichloroethane is added and the solid 3.0 g. is filtered off. Recrystallization of the solid from ethanol affords the product, M.P., 184–186° C.

EXAMPLE 7

3-(2-amino-5-chlorobenzoyl) 4-morpholinobenzenesulfonamide

A mixture of 5.0 g. of 3-(2-amino-5-chlorobenzoyl)-4-chlorobenzenesulfonamide and 50 ml. of morpholine is refluxed for 18 hours. The reaction mixture is cooled, diluted with water and the solid 1.8 g., is filtered. The solid product after recrystallization from an ethanol and water mixture melts at 208–210° C.

EXAMPLE 8

The procedures of Examples 1, 3, 6 and 7 are repeated substituting stoichiometrically-equivalent amounts of appropriately-substituted starting materials and the following additional compounds within the scope of this invention are prepared.

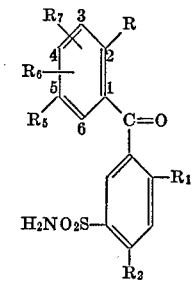

| R   | R₁       | R₂       | R₅    | R₆      | R₇    |
|-----|----------|----------|-------|---------|-------|
| NH₂ | H        | H        | Cl    | 3-Cl    | 4-Cl  |
| NH₂ | Cl       | Cl       | CH₃   | H       | H     |
| NH₂ | Cl       | Cl       | CH₃O  | H       | H     |
| NH₂ | CH₃      | CH₃      | Cl    | H       | H     |
| NH₂ | CH₃O     | CH₃O     | Cl    | H       | H     |
| NH₂ | H        | H        | Br    | H       | H     |
| NH₂ | H        | H        | I     | H       | H     |
| NH₂ | H        | H        | F     | H       | H     |
| NH₂ | H        | H        | Cl    | 6-CH₃   | H     |
| NH₂ | H        | H        | Cl    | 6-CH₃O  | H     |
| NH₂ | NH₂      | NH₂      | Cl    | H       | H     |
| NH₂ | N(CH₃)₂  | N(CH₃)₂  | Cl    | H       | H     |
| NH₂ | NHCN₃    | NHCH₃    | Cl    | H       | H     |

What is claimed is:
1. A compound of the formula:

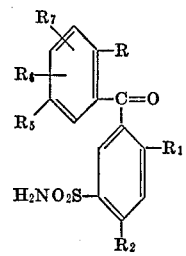

wherein R is mono or dichloro(lower)alkanoylamino;
R$_1$ and R$_2$ are hydrogen, halogen, alkyl, alkoxy

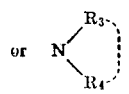

R$_3$ and R$_4$ are hydrogen, alkyl, or

—CH$_2$CH$_2$OCH$_2$CH$_2$— and R$_5$, R$_6$ and R$_7$ are halogen, alkyl, or alkoxy, or R$_6$ and R$_7$ are hydrogen, said mono or dichloro(lower) alkanoylamino, and said alkyl and alkoxy groups containing from 1 to 6 carbon atoms.

2. A compound as defined in claim 1, which is 3-[2-mono(dichloroacetyl)amino - 5 - chlorobenzoyl] benzenesulfonamide.

3. A compound as defined in claim 1, which is 3-[2-mono(dichloroacetyl)amino - 5 - chlorobenzoyl] - 4-chlorobenzenesulfonamide.

4. A compound as defined in claim 1, which is 3-[2-mono(3 - chloropropionyl) amino - 5 - chlorobenzoyl] benzenesulfonamide.

5. 3-(2-amino-5-chlorobenzoyl)-4-morpholinobenzene-sulfonamide.

References Cited

UNITED STATES PATENTS 3,055,930  9/1962  Graf et al. _____ 260—470

CECILIA M. SHURKO, Assistant Examiner

U.S. Cl. X.R.

260—247.1, 397.7, 556, 574, 578; 424—228, 229, 248, 321

PO-1050
(5/69)

UNITED STATES PATENT OFFICE
CERTIFICATE OF CORRECTION

Patent No. 3,516,992    Dated June 23, 1970

Inventor(s) Stanley C. Bell

It is certified that error appears in the above-identified patent and that said Letters Patent are hereby corrected as shown below:

In column 7, line 3, the formula should read:

or 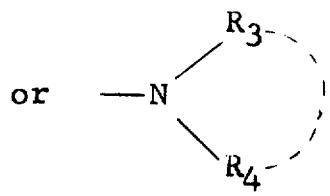

SIGNED AND
SEALED

SEP 29 1970

(SEAL)
Attest:

Edward M. Fletcher, Jr.
Attesting Officer

WILLIAM E. SCHUYLER, JR.
Commissioner of Patents